H. K. MOORE.
PROCESS OF MAKING CALCIUM HYPOCHLORITE.
APPLICATION FILED OCT. 31, 1914.

1,155,605. Patented Oct. 5, 1915.

Witnesses:
Inventor: Hugh K. Moore

UNITED STATES PATENT OFFICE.

HUGH K. MOORE, OF BERLIN, NEW HAMPSHIRE.

PROCESS OF MAKING CALCIUM HYPOCHLORITE.

1,155,605.  Specification of Letters Patent.  Patented Oct. 5, 1915.

Application filed October 31, 1914. Serial No. 869,688.

*To all whom it may concern:*

Be it known that I, HUGH K. MOORE, a citizen of the United States, and a resident of Berlin, in the county of Coos and State of New Hampshire, have invented certain new and useful Improvements in Processes of Making Calcium Hypochlorite, of which the following is a specification.

This invention has relation to the manufacture of commercial bleach, *i. e.*, calcium hypochlorite, such as used for bleaching paper, pulp, textiles, etc., and ordinarily sold as a disinfectant under the name of "chlorid of lime".

The object of the invention is to provide a process for making bleach continuously, as opposed to the intermittent or chamber process, for preventing the product from chlorating, and for eliminating those conditions which are dangerous to the health and life of the operative,—at the same time enabling the manufacture to be carried on at a low cost.

When subjected to mechanical agitation, calcium hypochlorite, because of the contained water, becomes pasty and "balls", and this characteristic, together with the unstable nature of the compound, has heretofore made it necessary to employ the chamber or intermittent process in its manufacture.

I have discovered that, by chilling or refrigerating the calcium hydroxid, while it is being acted on by the chlorin, and the resultant product to a fairly low temperature, it is possible to subject the product to mechanical agitation without its becoming pasty or balling. Preferably this refrigeration should be sufficient to absorb or abstract the heat liberated by the chemical reaction and permit the bleach to be formed at a temperature at or below the freezing point of water. A further result secured by the refrigeration is the prevention of the product from chlorating, so that a product may be obtained which is purer and more effective as a bleach or disinfectant than heretofore.

Figure 1:
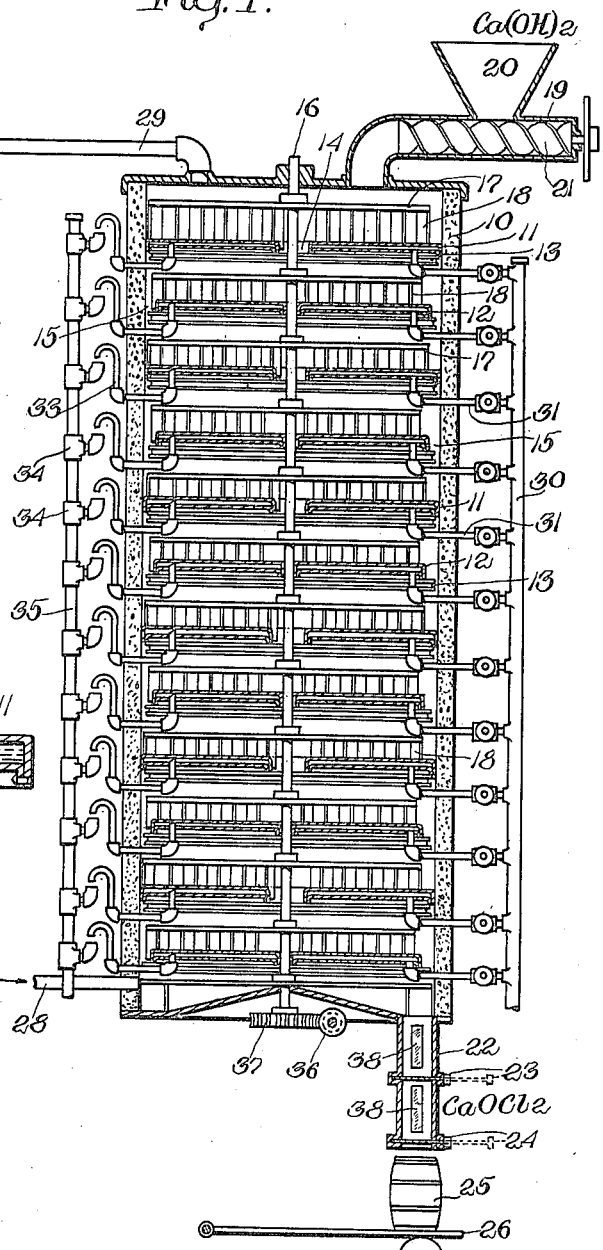
Figure 2:
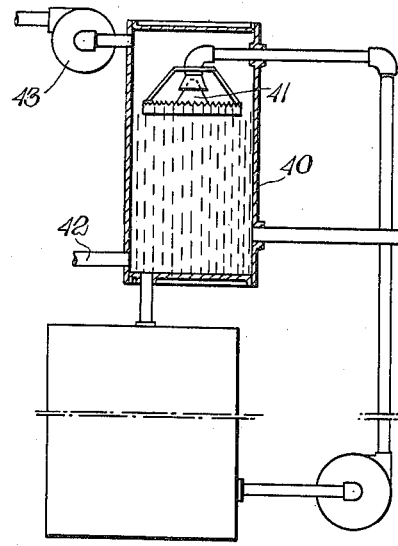
Figure 2:
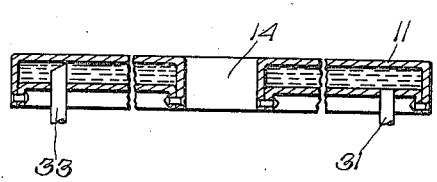

On the accompanying drawings: Figure 1 illustrates more or less conventionally apparatus which may be employed in practising the invention. Fig. 2 shows in section one of the refrigerating shelves.

Before describing the various instrumentalities which I have illustrated, I wish it to be understood that the invention is limited neither to the exact details or steps nor to the employment of the form of apparatus, which I shall describe in order that the invention may be practised commercially and satisfactorily.

In practice, I may add to calcium oxid 40% to 50% of its weight in water, and permit the lime to slake and steam. The resulting hydrate is sieved, and that which passes through the sieve and which is a dry powder is utilized for the subsequent treatment to be described. The material which remains may be employed in making liquid bleach, or may be reslaked in the succeeding batch, using a smaller quantity of water. Preferably, in hydrating the lime, a greater proportion of water is used than is theoretically necessary for the hydration, so that, although a dry hydroxid of lime is obtained, there is sufficient water to expedite the subsequent reaction with chlorin, since the speed of the reaction decreases with the degree of refrigeration.

The dry hydroxid may with convenience, be fed into the upper portion of a casing containing refrigerated shelves or baffles, and be fed downwardly therethrough, while at the same time chlorin is passed in the opposite direction through the casing in contact with the baffles and the hydroxid. The hydroxid in passing reacts with the chlorin and forms calcium hypochlorite according to the well known reaction:

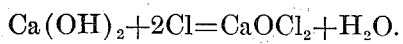

$$Ca(OH)_2 + 2Cl = CaOCl_2 + H_2O.$$

Referring to the accompanying drawing which illustrates one form of apparatus which may be used, 10 indicates a tower or casing which is illustrated as cylindrical in shape. This may be conveniently made of reinforced concrete. It is provided with a series of hollow shelves or partitions 11, 12, which are supported on crossbars 13. Each alternate shelf 11 is formed with a central passageway 14, while the others, 12, are less in outside diameter than the tower so as to leave an annular passageway 15, through which passageways the material may be fed from top to bottom of the tower. A shaft 16 is arranged in the tower, and is provided with a series of arms 17, one or more above each shelf, which carry scrapers 18. These scrapers are set to feed the material on the shelves 12 outwardly, and that on the shelves 11 inwardly, so that the material is caused to drop from each shelf to the one immediately below. The calcium hydrate is fed to the top of the tower through a cylinder 19 provided with a suitable hopper 20, and a power-driven conveyer 21. At the lower end of the tower, the product is delivered through a vertical conduit 22, provided with two separated gates 23, 24, to receptacles such as 25. In practice the gate 24 is closed until the accumulated hypochlorite rises to the level of the gate 23, as may be observed through the windows 38, whereupon the gate 23 is closed, and the gate 24 is opened to permit the discharge of the accumulated hypochlorite to the receptacle 25, after which the gate 24 is closed and gate 23 is opened, thus preventing the entrance of air to the tower or the escape of chlorin. Preferably the receptacles are placed on a platform 26 which is vibrated by any suitable means, such as a (conventionally shown) rapidly rotating cam, to jar and pack the hypochlorite in the receptacle.

The chlorin is delivered to the lower portion of the tower from a suitable source of supply by a conduit 28, and such chlorin as is unused in passage through the tower is withdrawn by a conduit 29 at the top by any suitable form of suction apparatus.

The hollow shelves are refrigerated and to this end a suitable refrigerant is fed thereto by a conduit 30 connected therewith by branches 31, leading through the wall of the tower and provided with valves. Leading from each shelf there is a conduit 33, discharging into a joint 34 of a return pipe 35. Any suitable refrigerant, such as brine, for example, may be used, and, as any suitable apparatus may be used for refrigerating it, I have not attempted to show any such apparatus on the drawing. The shaft 16, which carries the scrapers, is rotated by any suitable mechanism, as for instance a worm 36 and wheel 37 to which power is transmitted from a suitable source.

In operation the dry calcium hydroxid is fed into the tower and is passed downwardly therethrough from shelf to shelf, and at the same time chlorin is caused to travel upwardly through a tortuous course, and, coming in contact with the hydroxid, reacts therewith and forms calcium hypochlorite, with the liberation of water. As the hydroxid and hypochlorite pass in contact with the shelves, they are refrigerated to a temperature at or below 0° C. to freeze the water and keep it in a frozen condition. To this end, the refrigerant is delivered to the shelves at a temperature of 0° C. to —5° C., in sufficient volume and at the necessary velocity to absorb or abstract the heat liberated in the exothermic reaction going on in the tower, and also to reduce the temperature of the materials to the freezing point of water. The chlorin in passing through the tower comes in contact with the refrigerated shelves, which act as baffles, and its temperature is reduced coincidently with the refrigeration of the powdery mass. Hence both agents in the reaction are refrigerated to a temperature at or below 0° C. before the reaction takes place. The molecules of $H_2O$ are liberated, probably not as liquid but as ice, and are therefore not adhesive to adjacent particles. This apparently accounts for the product remaining in a dry non-pasty mass. This ice is chilled below 0° C., and the heat liberated by the chlorination of the hydroxid, is absorbed by the previously formed ice and the refrigerated hydroxid,—doubtless raising their temperatures, but not to a point over 0° C.

By thus refrigerating the materials, several important results are obtained. In the first place, the freezing of the water prevents the materials from becoming pasty or from forming balls or chunks while undergoing agitation and manipulation, and permits its being mechanically fed through the tower, thereby enabling the process to be carried on continuously. Again, by abstracting the heat liberated by the reaction, there is prevented a secondary reaction of the hypochlorite into the chlorid and chlorate, and a consequent saving of chlorin which would be used in the secondary reactions.

By the process which I have described, I have eliminated practically all hand labor and the cost of maintenance of the expensive lead chambers used in the familiar intermittent process. Furthermore, I am able to prevent the escape of chlorin, which is a menace to health and vegetation and which is inevitable in practising the chamber process.

On the drawing, I have illustrated a tower for making liquid bleach, in which may be utilized that portion of the calcium hydroxid which fails to pass through the sieve and which therefore is not used in the dry process. This tower, which is indicated at 40, is provided with a spraying head 41 for the milk of lime by which the liquid is broken up into a state of fine division. That portion of the chlorin (if there be any) which is unused in the tower 10 is conducted to the tower 40 by the conduit 29, and passing through the spray is completely absorbed. Additional chlorin may be supplied through a conduit 42. Connected with the top of the tower is a suction pump, such as that indicated at 43.

While I have described the process in connection with the manufacture of calcium hypochlorite, it is quite apparent that it may be practised in connection with the manufacture of other products in which the chemical reaction produces water, or a pasty mass, since in such case the freezing of the water or other liquid compound reduces it to a dry condition suitable for manipulation.

In all probability, the initial slaking of the mass of calcium oxid does not result in the hydration of all of the particles of the oxid, so that when the sieved powder is conducted through the tower, the water liberated in the reaction to hypochlorite, probably hydrates the particles of the yet unhydrated oxid. In fact, I may add a quantity of finely ground oxid of lime to the calcium hydroxid for the purpose of taking up the water liberated by the reaction of the chlorin and hydroxid in the upper part of the tower before the water becomes frozen. In this connection, it will be noted that the temperature of the shelves may be regulated by the valves in the branch pipes, which may be adjusted to let a larger or smaller volume of refrigerant pass through the shelves. Thus the individual shelves may be maintained at any desired temperatures, or at gradually decreasing temperatures to cause the product to be gradually refrigerated as the chlorination progresses. In some cases it is desirable to refrigerate the hydroxid prior to its delivery to the tower, and this may be accomplished by any suitable form of refrigerating apparatus.

I have referred to the calcium hydroxid as "dry" or "powdered" to distinguish it from a solution, and not as indicating that there is no contained water chemically uncombined. For example, the calcium hydroxid might be represented by the formula

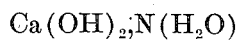

$$Ca(OH)_2;N(H_2O)$$

where N is not high enough to produce a solution or a wet mass, and the calcium hypochlorite produced therefrom might be represented similarly as

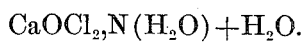

$$CaOCl_2,N(H_2O)+H_2O.$$

Thus in neither case is the hydroxid or the hypochlorite "chemically" dry, although each is properly described physically as dry or powdery. With this process I am able to produce a bleaching powder having at least 39% available chlorin, although commercial bleaching powder, which should contain 35%, seldom contains over 37% available chlorin.

One of the results following from the refrigeration of the chlorin is that the vapor tension of any water contained therein is reduced to a point at which there is no reaction of the mixture upon materials, such as iron, which at ordinary temperatures would be acted on by the mixture. Hence I may employ scrapers, shelves, etc., made of iron instead of lead or enameled material, without their being attacked or destroyed.

Having thus described a method of practising the invention and a form of apparatus which may be employed in connection therewith, without attempting to set forth all of the methods by which it may be practiced or all of the forms of apparatus which may be used therewith, what I claim is:

1. The herein described method of making dry calcium hypochlorite which consists in chlorinating powdery calcium hydroxid, and refrigerating the product to approximately the freezing point of water.

2. The herein described method of making dry calcium hypochlorite which consists in chlorinating powdery calcium hydroxid and abstracting from the product the heat liberated by the reaction, together with sufficient heat to leave the contained water in frozen condition.

3. The herein described method of making dry calcium hypochlorite which consists in chlorinating powdery calcium hydroxid, refrigerating the product at or below the freezing point of water, and withdrawing the product in dry condition.

4. The herein described process which consists in subjecting a powdery material to reaction with a gas and liberating a liquid-forming substance, and simultaneously refrigerating the product below the freezing temperature of such substance leaving the product in a dry or powdery condition.

5. The herein described process which consists in mechanically feeding calcium hydroxid while in contact with chlorin to form hypochlorite and refrigerating the same to a freezing temperature to prevent the balling of the product.

6. The herein described process which consists in refrigerating dry calcium hydroxid and chlorin at a point at or below 0° C., bringing the same into contact to form calcium hypochlorite, and refrigerating and withdrawing the product.

7. The herein described process which consists in mechanically feeding dry calcium hydroxid through a chamber, bringing chlorin into intimate contact with said hydroxid in said chamber to form hypochlorite, maintaining said hypochlorite in a dry state in said chamber by refrigerating the same at or below the freezing point of water, and withdrawing said hypochlorite.

8. The herein described process which consists in mechanically feeding dry calcium hydroxid over a surface refrigerated to a temperature at or below 0° C., chlorinating the hydroxid, and continuously withdrawing the refrigerated product in powdery condition.

9. The herein described process which consists in refrigerating dry calcium hydroxid and chlorin to or below 0° C., bringing the same into intimate contact to form hypochlorite, and refrigerating the hypochlorite to maintain the contained free water in frozen condition.

10. A process of making hypochlorite of calcium, which consists in chlorinating calcium hydroxid with chlorin refrigerated to a temperature at which the vapor tension of water contained therein is reduced to a point where the mixture fails to act upon materials attacked thereby at ordinary temperatures.

11. The herein described process which consists in subjecting a powdery substance to reaction with a gas and forming a substance which at ordinary temperatures would be a liquid, and refrigerating said agents to a temperature below the melting point of said substance to cause the formation of said substance as a solid.

12. The herein described process which consists in causing the reaction of a solid and a gas with the consequent liberation of $H_2O$, and refrigerating said agents to a temperature at or below 0° C. thereby causing the formation of the liberated $H_2O$ as a solid.

In testimony whereof I have affixed my signature, in presence of two witnesses.

HUGH K. MOORE.

Witnesses:
MARCUS B. MAY,
P. W. PEZZETTI.